Figure 1:
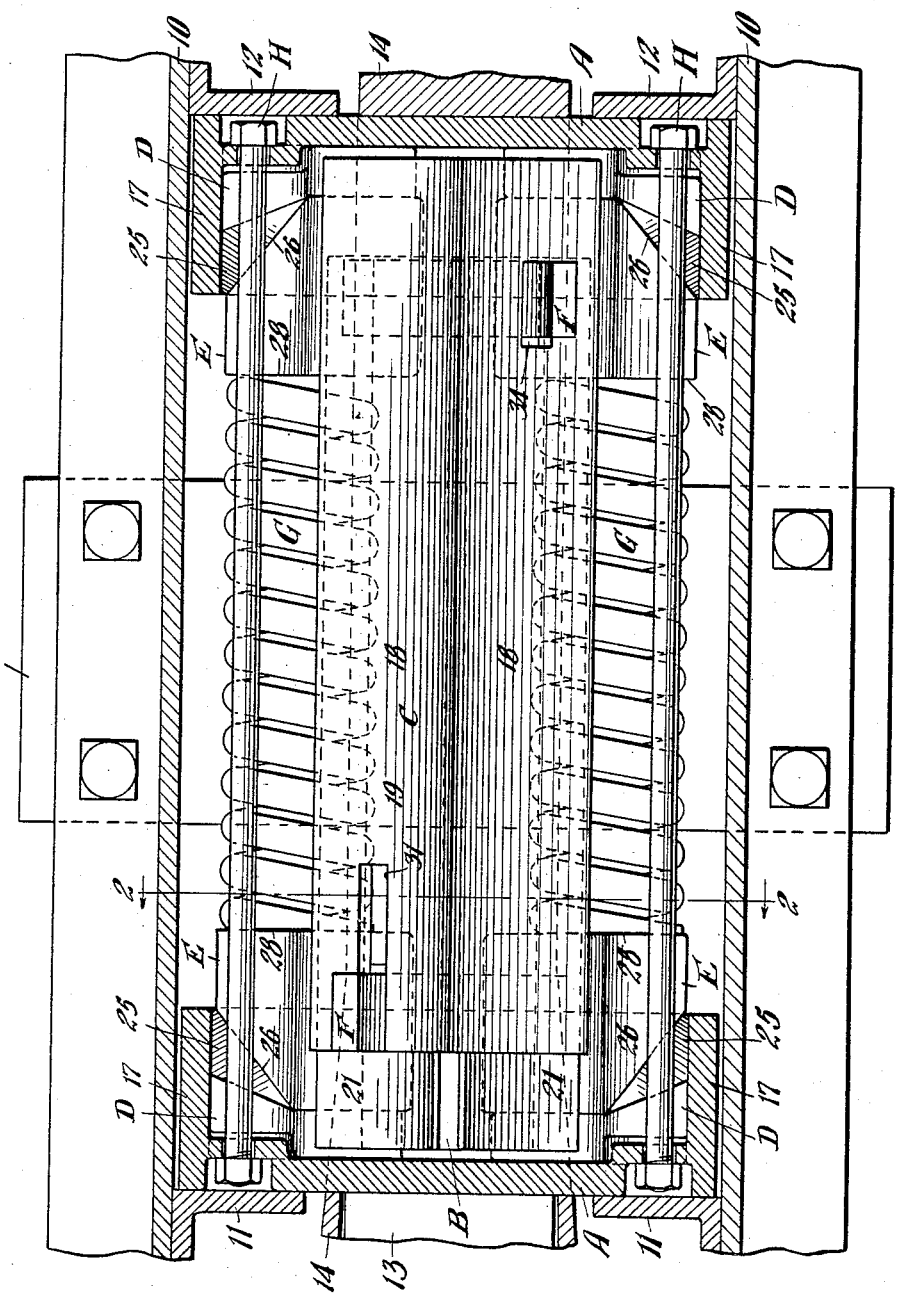

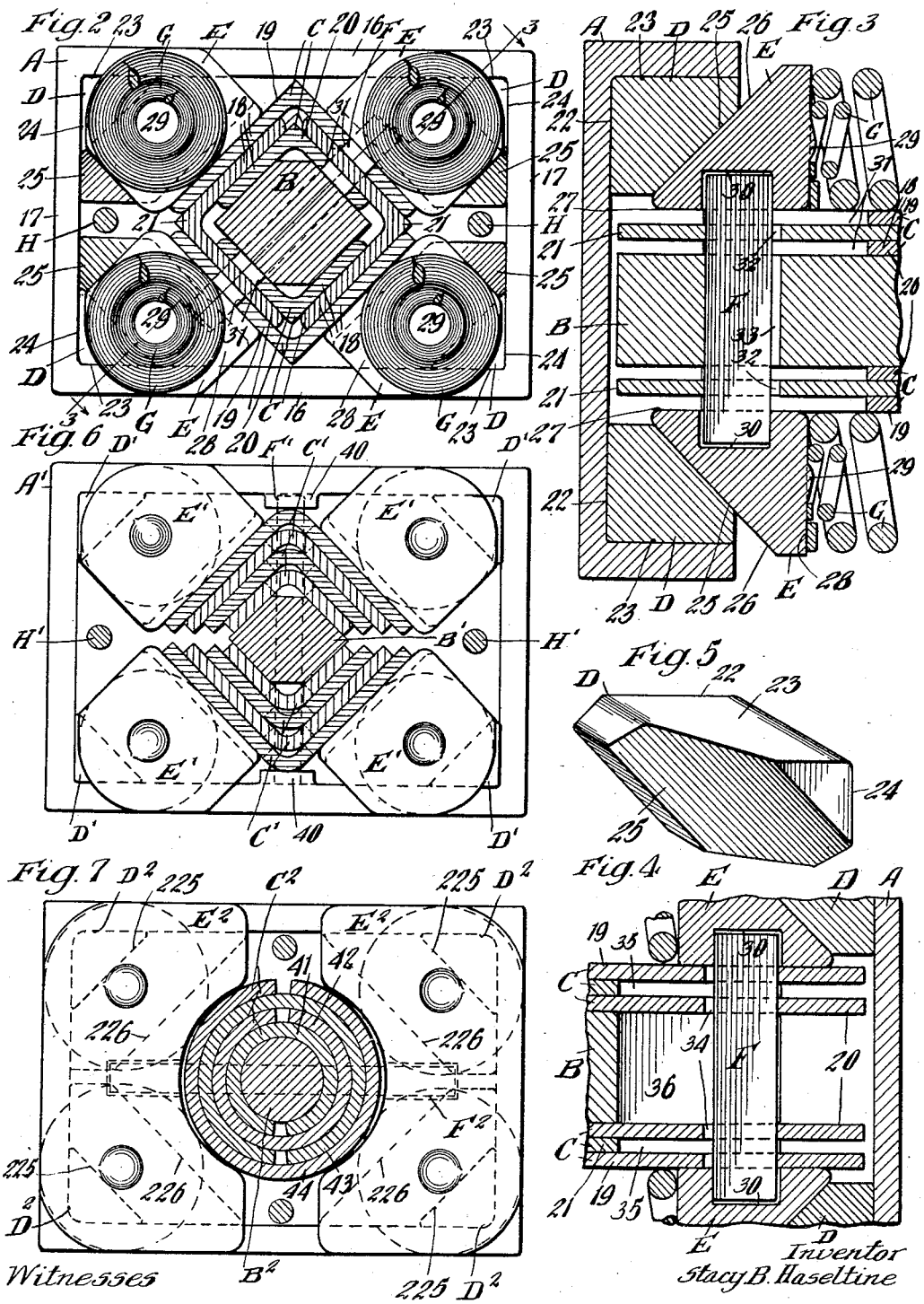

Patented Aug. 9, 1932

1,870,508

UNITED STATES PATENT OFFICE

STACY B. HASELTINE, OF CHICAGO, ILLINOIS, ASSIGNOR, BY MESNE ASSIGNMENTS, TO W. H. MINER, INC., A CORPORATION OF DELAWARE

FRICTION SHOCK ABSORBING MECHANISM

Application filed August 2, 1923, Serial No. 655,223. Renewed September 2, 1927.

This invention relates to improvements in friction shock absorbing mechanisms.

One object of the invention is to provide a friction shock absorbing mechanism, particularly adapted for use in connection with railroad draft riggings, wherein high capacity is had, due to large friction areas.

A further object of the invention is to provide a friction shock absorbing mechanism, including a plurality of plates co-acting with a central friction post, wherein the plates are arranged in nested relation embracing the post, and wherein a plurality of diagonally disposed wedging systems are arranged to co-operate with the plates.

Other objects and advantages of the invention will more clearly appear from the description and claims hereinafter following.

In the drawings forming a part of this specification, Fig. 1 is a horizontal, longitudinal, sectional view of a part of a draft rigging showing my improved shock absorbing mechanism in connection therewith, the friction plates being shown in plan. Fig. 2 is a vertical, transverse sectional view corresponding substantially to the line 2—2 of Fig. 1. Fig. 3 is a longitudinal sectional view of the forward end portion of the mechanism, corresponding substantially to the line 3—3 of Fig. 2. Fig. 4 is a view similar to Fig. 3 showing the rear end portion of the mechanism, the section being taken on a plane at right angles to the line 3—3 of Fig. 2. Fig. 5 is a detailed, perspective view of one of the wedge blocks. Fig. 6 is a view similar to Fig. 2, the springs being omitted, illustrating a different embodiment of the invention. And Fig. 7 is a view similar to Fig. 6 showing still another embodiment of the invention.

In said drawings, referring first to the construction illustrated in Figs. 1 to 5 inclusive, 10—10 indicate channel draft sills of a railroad car underframe, to the inner faces of which are secured front stop lugs 11 and rear stop lugs 12. A portion of the drawbar is indicated at 13, to which is attached a hooded yoke 14. The shock absorbing mechanism proper, including the front and rear followers, is disposed within the yoke 14, and the movable parts of the draft rigging are supported by a detachable saddle plate 15.

The preferred form of the improved shock absorbing mechanism proper, as clearly shown in Figs. 1 to 5 inclusive, comprises, broadly, front and rear followers A—A; a central friction post B; a plurality of friction elements C—C; front and rear wedge blocks D—D; front and rear friction shoes E—E; a pair of keys F—F; spring resistances G—G; and retainer bolts H—H.

The front and rear followers A are of similar construction, and co-act respectively with the front and rear stop lugs. Each of the followers A is of rectangular form and is provided with spaced, horizontal, inwardly projecting top and bottom flanges 16—16 and vertically arranged, spaced, longitudinally projecting side flanges 17—17.

The central friction post B is in the form of an elongated bar of square cross section, so arranged that vertical and horizontal planes passing through the axis of the mechanism coincide with the diagonals of the cross-section thereof, thereby disposing the faces of the post at angles of 45° to the vertical. The post B is of a length to permit full compression of the mechanism, before the ends thereof engage the front and rear followers respectively, and normally has both the front and rear ends thereof spaced from the adjacent followers, the front end being spaced slightly from the front follower to permit of an initial action of the mechanism before engagement therebetween, as hereinafter described, and the rear end of the post B being spaced a relatively greater distance from the rear follower to permit of the full compression of the mechanism before engagement therebetween.

The friction elements C are all of like construction, being in the form of elongated plates of V-shaped cross-section, each having the side portions 18 thereof disposed at right angles to each other. I preferably provide six such plates, two sets of upper and lower plates, each set comprising two plates 19 and 20, and a pair of side plates 21—21 disposed on opposite sides of the post B. The plates 20 of the upper and lower sets are disposed innermost and have the side portions 18 thereof co-acting respectively with the two upper and lower faces of the post, and the plates 19 are disposed outermost and have the side portions 18 thereof disposed parallel to and extending in the same direction as the side portions 18 of the plates 20, each of the arms 18 of the plates 19 being adapted to co-act with a pair of wedge shoes E disposed respectively at the front and rear ends of the mechanism. Each of the side plates 21 is so disposed that the side portions 18 thereof project upwardly and downwardly respectively in parallel relation to the adjacent portions 18 of the plates 19 and 20 of the upper and lower sets, the upwardly projecting portions 18 of the plates 21 being interposed between the corresponding side portions of the upper plates 19 and 20, and the downwardly projecting portions of the plates 21 being interposed between the corresponding side portions of the lower set of plates 19 and 20. The plates are thus arranged in nested relation embracing the post B. The plates 19, 20 and 21 are of the same length, being equal in length to the post B, and the plates 21 have their front and rear ends normally in alinement with the corresponding ends of the post B and correspondingly spaced from the front and rear followers. In the normal position of the parts, the plates 19 and 20 have their rear ends slightly spaced from the rear follower, the spacing corresponding to that between the front ends of the plates 21 and the front follower. It will also be evident that in the normal position of the parts, the front ends of the plates 19 and 20 are necessarily spaced from the front follower a distance equal to the space between the rear ends of the plates 21 and the rear follower.

The wedge blocks D are eight in number, four being associated with each follower A, one block being located at each corner of the follower A. Each of the wedge blocks D, as clearly shown in Fig. 5, is provided with an outer flat face 22 adapted to co-act with the inner face of one of the followers A, two flat side faces 23 and 24 adapted to co-act respectively with the walls 16 and 17 of one of the followers A, and a flat wedge face 25 disposed diagonally with reference to the longitudinal, vertical and transverse horizontal axes of the mechanism.

The friction shoes E are also eight in number, four being associated with each of the followers and adapted to co-operate with the corresponding wedge blocks D. Each of the friction shoes E is provided with a flat wedge face 26 adapted to co-act with the wedge face 25 of the corresponding wedge block D and correspondingly inclined with said face 25, a flat side 27 adapted to co-act with the corresponding side portion 18 of the adjacent plate 19, and a flat transverse face 28 forming an abutment for the corresponding spring resistance G.

The spring resistances G are four in number, located in the corners, alongside the groups of friction plates and each is interposed between a pair of friction shoes E. Each of the spring resistances G comprises a relatively heavy outer coil and a relatively lighter inner coil, the inner coil being held in centered position by means of lugs 29 projecting from the faces 28 of the friction shoes F.

To effect restoration of the friction elements C and the post B to normal position after each compression stroke of the mechanism, the same are connected to move with the corresponding friction shoes E by means of the keys F. Two keys F are provided, one at each end of the mechanism. The key F at the front end of the mechanism has its opposite ends anchored in two diagonally opposite shoes E at the front end of the mechanism, each of said shoes E being provided with a recess 30 on its inner side adapted to accommodate the corresponding end of the key. The front key F extends through alined slots in the plates C and the post B, the side portions 18 of the plates 19 and 20 being provided with elongated slots 31 extending to the front ends thereof, the corresponding side portions 18 of the plates 21 being provided with relatively short slots 32 spaced inwardly from the front ends thereof, and the post B being provided with a slot 33 corresponding in width and length to the slots 32. The slots 32 of the plates 21 and the slot 33 of the post B are of slightly greater length than the width of the key F and consequently permit of a limited relative movement. The slots 31 of the plates 19 and 20 are of sufficient length to permit engagement of the front ends of the latter with the front follower when the key is moved rearwardly with the wedge shoes E. The key F at the rear end of the mechanism is anchored to two diagonally opposite shoes E at the rear end of the mechanism, by having its opposite ends engaged within recesses 30 similar to the recesses of the front shoes E, the shoes to which the rear key F is anchored, however, being those disposed on a diagonal line at right angles to the diagonal on which the shoes are disposed to which the front key is anchored. The rear key F extends through alined slots at the rear ends of the plates C and the post B, the corresponding side portions 18 of the plates 19 and 20 being provided with short slots 34, the corresponding side portions of the plates 21 being provided with elongated slots 35 extending to the rear ends thereof, and the post B being provided with a slot 36 corresponding in length to the slots 35 and also extending to the rear end of the post, the slots 35 and 36 functioning in a manner similar to the slots 33 at the front ends of the plates 19 and 20. The slots 34 of the plates 19 and 20 are of slightly greater length than the width of the rear key F and function in a manner similar to the slots 32 at the front ends of the plates 21.

The retainer bolts H are two in number and are arranged at opposite sides of the front and rear followers, and are adapted to hold the parts of the gear in assembled relation and the springs under initial compression. Each of the retainer bolts passes between the upper and lower spring resistances G of each pair and through alined recesses in the front and rear followers A. The bolts are anchored in the front and rear followers respectively, the followers having the adjacent parts thereof inwardly off-set to accommodate the heads and nuts of the bolts, and the corresponding wedge blocks D having their outer faces 22 correspondingly cut away to accommodate the offset parts.

In the operation of my improved shock absorbing mechanism, as shown in Figs. 1 to 5 inclusive, assuming that the front follower A is being moved rearwardly toward the rear follower during buff, a wedging action will be set up between the wedges D and the friction shoes E at both ends of the mechanism, thereby placing the friction plates C under compression and pressing the innermost plates 20 firmly against the friction post B, augmenting the frictional resistance between the plates and between the innermost plates and the post. During the further inward movement of the front follower A the same will approach the adjacent outer ends of the friction plates 21 and the front end of the friction post B, and the opposite ends of the plates 19 and 20 will gradually approach the rear follower A until all of the plates and the post are engaged by the respective followers and are moved relatively to each other. This relative movement of the plates and the post will continue until the gear is fully compressed. When the gear is fully compressed, the front and rear ends of all of the plates and the front and rear ends of the post B will abut both followers, whereby the same form a column-load-sustaining means transmitting the pressure directly from the front follower to the rear follower.

During draft the action of the shock absorbing mechanism is similar to that just described, the only difference being that the rear follower A is moved relatively to the front follower.

Upon discontinuance of the pressure upon the shock absorbing mechanism, the wedge blocks D, by reason of the relative bluntness of the angle included between the wedging faces of the four blocks associated with each follower, will be permitted to break away from the friction shoes E thereby effecting a reduction of the pressure on the plates C and the post B prior to any relative movement thereof. After the wedging pressure has been thus relieved, the springs G will thrust the front and rear shoes E in opposite directions carrying the front and rear keys F therewith until the latter members engage respectively with the outer walls of the slots at the front ends of the plates 21 and the post B and the outer walls of the slots at the rear ends of the plates 19 and 20, thereby drawing the plates and the friction post in opposite directions longitudinally upon further relative separation of the friction shoes, E, thus returning the plates C, the post B and the shoes E to normal position with the ends of the plates and post spaced from the inner walls of the front and rear followers as clearly shown in Figures 1, 3, and 4.

Referring next to the modification illustrated in Figure 6, the construction is in all respects similar to the construction illustrated in Figures 1 to 5 inclusive with the exception that the arrangement of the friction elements is somewhat different.

In the construction shown in Figure 6, two groups of friction plates G'—C' are employed, the same being disposed above and below the central friction post B'. As shown, each of the groups of friction plates C' comprises four elongated plates of V-shaped cross-section, the innermost plate of each group coacting with the two adjacent faces of the post B' and the outermost plate of each group co-acting with two adjacent friction shoes E' at each end of the mechanism. The plates C' and the post B' are similarly arranged to the corresponding parts of the form hereinbefore described, alternate plates of each group and the post B' having their front ends spaced slightly from the front follower and their rear ends spaced a sufficient distance from the rear follower to permit of the desired compression of the device, the rear ends of the remaining plates C' being slightly spaced from the rear follower and front ends spaced a sufficient distance from the front follower to also allow the desired compression. The plates are returned to normal position by keys F' at opposite ends of the mechanism, acting in a manner similar to the keys F hereinbefore described, the only difference being that the keys F' at the front and rear ends of the mechanism are arranged in alinement, each of the same co-acting with lugs 40 extending downwardly and upwardly respectively from the top and bottom walls of the followers A' instead of being anchored to the friction shoes E as hereinbefore described. At the front ends, alternate plates of the group C' are provided with short slots and the post B' is provided with a slot of corresponding length adapted to co-act with the key F' and the rear ends of the remaining plates are provided with short slots coacting with the rear key F', whereby the plates and post B' are returned to normal position after compression of the mechanism by the keys F' being separated by the front and rear followers A', respectively. During compression, the various members of the group C' and the post B' are held in close frictional engagement by means of a set of wedge blocks D' coacting with the shoes E' at either end. The parts of the mechanism are held in assembled relation and the springs under initial compression by longitudinally extending bolts H' anchored respectively to the front and rear followers and functioning in a manner similar to the bolts H. The operation of the mechanism shown in Figure 6 is in all respects similar to that hereinbefore described.

Referring next to the construction illustrated in Figure 7, the arrangement is substantially the same as that shown in Figures 1 to 5 inclusive with the exception that but two oppositely disposed friction shoes $E^2$ are employed at each end of the central friction post $B^2$ and the plates $C^2$ are of somewhat different design, the post being in the form of a cylindrical bar and the friction plates being in the form of cylinders open at one side. As shown in Figure 7, the friction plates $C^2$ are arranged in nested relation and comprise four plates 41, 42, 43 and 44, the plates 41 and 43 being alternated with the plates 42 and 44. Each of the plates 41 and 43 has the opening thereof arranged at the lower side and each of the plates 42 and 44 has the opening disposed at the upper side thereof opposite to the openings in the plates 41 and 43. The inner faces of the friction shoes $E^2$ are curved to correspond with the curvature of the outer friction plate 44, but at a slightly smaller radius as shown, in order to better distribute the loads over the surfaces of the various friction plates $C^2$, and each of the shoes is provided with a pair of outer wedge faces 226, correspondingly inclined to and adapted to co-act with the wedge faces 225 of the two adjacent wedge blocks $D^2$. The friction plates $C^2$ and the post $B^2$ are restored to normal position in a manner similar to the friction plates and post shown in Figures 1 to 5 inclusive, the only difference being that the keys $F^2$ disposed at the front and rear ends of the mechanism and anchored to alternate plates and the friction post respectively are arranged in parallel relation engaging recesses within the corresponding opposed friction shoes $E^2$. The operation of the device shown in Figure 7 is in all respects similar to the operation of the mechanism shown in Figures 1 to 5 inclusive.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with front and rear followers relatively movable toward and away from each other; of a plurality of longitudinally arranged intercalated friction plates interposed between said followers, said plates being adapted for relative movement upon relative movement of said followers; a spring resistance; a central friction post co-acting with said plates, said plates and post being engaged at opposite ends by said front and rear followers while the mechanism is fully compressed and having continuous flat fact to face contact with said followers, forming with said followers a solid column sustaining the load when the gear is under full compression; and a lateral wedge pressure creating means interposed between said followers and co-acting with said plates.

2. In a friction shock absorbing mechanism, the combination with a plurality of longitudinally arranged, intercalated friction plates of angular cross-section; of lateral wedge pressure creating means co-operating with said plates; a spring resistance; and means adapted to effect relative movement of said plates and co-acting with said pressure creating means during compression of the mechanism, said means being located at opposite ends of said plates.

3. In a friction shock absorbing mechanism, the combination with front and rear followers; of a spring resistance; a plurality of longitudinally arranged, relatively movable, intercalated friction plates interposed between said followers, adjacent plates being arranged in embracing relation with the side portions thereof overlapping; and wedge pressure creating means interposed between said followers and co-acting with said plates.

4. In a friction shock absorbing mechanism, the combination with front and rear followers relatively movable toward and away from each other; of a spring resistance between said followers; a central friction post; a plurality of relatively nested friction plates embracing said post, said post and plates being interposed between said followers, said plates being directly engaged and moved by the followers after a predetermined compression of the mechanism, and wedge pressure creating means interposed between said followers and co-acting with said plates.

5. In a friction shock absorbing mechanism, the combination with front and rear relatively movable followers; of a spring resistance interposed between said followers; a plurality of relatively movable, longitudinally extending, intercalated friction plates of angular cross-section interposed between said followers and adapted to be engaged and moved relatively by said followers; a central friction post co-operating with said plates;

and wedge pressure creating means interposed between said followers and co-acting with said plates.

6. In a friction shock absorbing mechanism, the combination with front and rear followers; of a spring resistance; a plurality of longitudinally extending, relatively movable, intercalated, friction plates interposed between said followers, said plates each comprising a pair of longitudinally extending portions disposed at an angle to each other, each plate having the pair of angularly disposed portions thereof co-operating with the angularly disposed portions of two adjacent plates; a wedge pressure creating means interposed between said followers and co-acting with said plates; and means for returning the plates to normal position with the ends thereof spaced from the followers.

7. In a friction shock absorbing mechanism, the combination with front and rear relatively movable followers; a centrally disposed, longitudinally extending, friction post; a plurality of longitudinally disposed, V-shaped, friction plates co-operating with said post, and arranged on opposite sides thereof, said plates and post being relatively movable upon relative movement of said followers, certain of said plates frictionally engaging said post; a spring resistance; and wedge pressure creating means interposed between said followers and co-acting with said plates.

8. In a friction shock absorbing mechanism, the combination with front and rear relatively movable followers; of a spring resistance; a plurality of longitudinally arranged, relatively movable, intercalated, V-shaped friction elements, adjacent elements being so arranged as to have the planes bisecting the apices thereof extending at right angles to each other, said plates being adapted to be moved relatively by said followers; and wedge pressure creating means interposed between said followers and co-acting with said plates for placing the same under lateral pressure.

9. In a friction shock absorbing mechanism, the combination with front and rear followers; of a spring resistance; a plurality of relatively movable friction plates, including two sets of longitudinally arranged, oppositely disposed V-shaped plates, the plates of each set being similarly disposed and reversely arranged with reference to plates of the other set, and a plurality of V-shaped plates co-acting with both of said sets of plates; and wedge pressure creating means disposed between said followers and co-acting with all of said friction plates.

10. In a friction shock absorbing mechanism, the combination with front and rear followers; of a spring resistance; a central friction post of angular cross-section; a plurality of relatively movable, intercalated plates, each plate comprising a pair of longitudinally extending members angularly disposed with reference to each other, two of said plates being disposed innermost on opposite sides of said post with the pair of angularly disposed members of each co-acting with two adjacent faces of said posts, each of said last named plates also co-acting with a plurality of remaining plates; and wedge pressure creating means interposed between said followers and co-acting with all of said plates.

11. In a friction shock absorbing mechanism, the combination with front and rear followers; of a spring resistance; a central friction post of square cross-section; a plurality of relatively movable, intercalated, V-shaped friction plates embracing said post, certain of said plates being disposed on opposite sides of said post, each of said plates co-acting with the remaining plates; and wedge pressure creating means interposed between said followers and co-acting with all of said plates.

12. In a friction shock absorbing mechanism, the combination with a follower; of a spring resistance; a central friction post; a plurality of relatively movable intercalated friction plates, certain of said plates being disposed on opposite sides of said post and having arms embracing said post and co-acting with the arms of the remaining plates; and wedge pressure creating means co-acting with said followers and plates.

13. In a friction shock absorbing mechanism, the combination with front and rear followers; of a spring resistance; a central friction post; a plurality of intercalated friction plates, each of said plates having longitudinally extending arms embracing said post, said plates being arranged in opposed pairs around said post, with the arms of each plate of each pair co-acting with the arms of a pair of the remaining opposed plates; and wedge pressure creating means co-acting with all of said plates.

14. In a friction shock absorbing mechanism, the combination with front and rear followers; of a spring resistance; a central longitudinally extending friction post of square cross-section; a plurality of intercalated, relatively movable, V-shaped friction plates disposed around said post, said plates each having the side members thereof at right angles to each other and arranged parallel to two adjacent faces of said post, said plates being so disposed that planes coinciding with the diagonals of said post will bisect the angles between said members of certain of said plates; and wedge pressure creating means interposed between said followers and co-acting with all of said plates.

15. In a friction shock absorbing mechanism, the combination with front and rear followers; of a central friction post; a plurality of intercalated friction plates interposed between said followers, each of said plates having longitudinally extending side portions overlapping said post, the said plates being adapted for relative movement upon relative movement of said followers during compression of the mechanism; and a plurality of wedge systems interposed between said followers and co-acting with said plates; said wedge systems being disposed diagonally on opposite sides of said plates.

16. In a friction shock absorbing mechanism, the combination with a plurality of longitudinally arranged, relatively movable, inter-engaging friction plates, certain of said plates embracing the remaining plates; a plurality of sets of wedges; a plurality of sets of wedge friction shoes co-operating with said wedges for forcing said plates into intimate frictional contact; means for effecting relative movement of said plates and for forcing said wedge blocks laterally against said shoes and also longitudinally of the mechanism; and means for yieldingly resisting movement of said friction shoes and wedge blocks during a compression stroke.

17. In a friction shock absorbing mechanism, the combination with front and rear followers; of a spring resistace; a friction post; a plurality of longitudinally arranged, intercalated friction plates embracing said post, said plates and post being interposed between said followers and adapted to be moved relatively thereby; a plurality of wedges engaging each of said followers, said followers having means thereon for preventing lateral outward movement of said wedges, a plurality of friction shoes co-acting with the wedges associated with each follower; and front and rear keys anchored respectively to certain of said shoes associated with the front and rear followers respectively, one of said keys co-acting with alternate plates and the post to return the same to normal position, and the other key co-acting with the remaining plates to return the same to normal position.

18. In a friction shock absorbing mechanism, the combination with a group of intercalated, relatively movable friction plates; of spring resistance means disposed about said plates; friction wedge shoes bearing on opposite sides of said group of plates, said shoes being arranged in sets at opposite ends of said plates; relatively movable follower acting means at opposite ends of the mechanism adapted to effect relative movement of said plates with reference to each other, said follower acting means and shoes having co-operating wedge faces; and means movable with the shoes for effecting restoration of the plates to normal position during release of the mechanism.

19. A friction draft gear including a center column; relatively longitudinally movable intercalated friction plates supported on the sides thereof; a constricting device; a plurality of application spring means located abreast on the sides of the column and acting on the constricting device to set up pressure on the plates and yieldingly resist relative motion of the plates in response to draft strains; and means for returning the plates to release position.

20. In a friction shock absorbing mechanism, the combination with front and rear follower elements, relatively movable toward and away from each other; of a central column; relatively, longitudinally movable, intercalated friction plates supported on opposite sides of said column; means for placing said plates under lateral pressure and pressing the same inwardly against said column, including front and rear sets of friction shoes on the outer sides of said plates and laterally inwardly acting wedge pressure creating means movable with said front and rear followers and having wedging engagement with the shoes; and spring resistance elements at the sides of said column and yieldingly resisting movement of said shoes.

21. In a shock absorbing mechanism, the combination with a longitudinally disposed column; of a plurality of sets of friction plates disposed on opposite sides of said column, the plates of said sets being intercalated and movable longitudinally of said column; front and rear follower elements relatively movable toward and away from each other; means disposed at opposite ends of said plates and actuated by said front and rear followers, respectively, for placing said plates under lateral pressure and pressing the same against the column, said intercalated plates being engaged respectively at the outer ends by said followers to be moved lengthwise thereby; and spring resistance means disposed exteriorly to said column and plates, and interposed between the means disposed at the opposite ends of the mechanism for placing the plates under lateral pressure.

22. In a friction shock absorbing mechanism, the combination with front and rear followers relatively movable toward and away from each other; of friction means including a central column and friction plates co-operating with said column, said plates being intercalated and relatively movable, certain of said plates being engaged by one of said followers and the remaining plates being engaged by the other follower to effect relative movement of said plates upon relative approach of said followers; means actuated by said followers upon relative approach thereof, for placing said plates under lateral pressure, including front and rear sets of friction shoes disposed at the opposite ends of said plates, each of said sets of shoes embracing the plates and central column; spring resistance means yieldingly opposing relative movement of the front and rear sets of shoes; and means for restoring said plates to release position.

23. A shock absorber comprising two relatively movable followers, an oversolid post arranged lengthwise between said followers and along the longitudinal center of the absorber and adapted to be engaged at its opposite ends by said followers, two groups of friction plates arranged on opposite sides of said post and each group consisting of two sets of intercalated friction plates, one set adapted to be engaged at its outer end by one of said followers and the other set adapted to be engaged at its outer end by the other follower, means for moving said friction plates lengthwise inwardly relatively to each other during a lengthwise compression load on the absorber and to move said plates outwardly after the compression load ceases, means for creating a transverse pressure on said plates during inward longitudinal movement of the same and to relieve said transverse pressure when the lengthwise compression load ceases, and a spring resistance.

In witness that I claim the foregoing I have hereunto subscribed my name this 30th day of July, 1923.

STACY B. HASELTINE.